United States Patent
Naito et al.

(10) Patent No.: US 9,865,402 B2
(45) Date of Patent: Jan. 9, 2018

(54) ANODE BODY FOR TUNGSTEN CAPACITORS

(71) Applicant: SHOWA DENKO K.K., Tokyo (JP)

(72) Inventors: Kazumi Naito, Tokyo (JP); Ryuichi Mitsumoto, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 15/106,358

(22) PCT Filed: Oct. 6, 2014

(86) PCT No.: PCT/JP2014/076697
§ 371 (c)(1),
(2) Date: Jun. 20, 2016

(87) PCT Pub. No.: WO2015/098230
PCT Pub. Date: Jul. 2, 2015

(65) Prior Publication Data
US 2017/0004927 A1    Jan. 5, 2017

(30) Foreign Application Priority Data
Dec. 27, 2013    (JP) ................................ 2013-272295

(51) Int. Cl.
*H01G 9/07* (2006.01)
*H01G 9/00* (2006.01)
(Continued)

(52) U.S. Cl.
CPC ............ *H01G 9/15* (2013.01); *H01G 9/0032* (2013.01); *H01G 9/052* (2013.01); *H01G 9/0525* (2013.01); *H01G 9/07* (2013.01)

(58) Field of Classification Search
CPC .................................... H01G 9/07; H01G 9/00
(Continued)

(56) References Cited

U.S. PATENT DOCUMENTS 9,053,860 B2 *   6/2015   Naito .................... B22F 1/0096
2010/0028250 A1   2/2010   Stoller et al.
(Continued)

FOREIGN PATENT DOCUMENTS

JP    2003272959 A  *  9/2003
JP    2006-063403 A     3/2006
(Continued)

OTHER PUBLICATIONS

International Search Report for PCT/JP2014/076697 dated Jan. 13, 2015.

*Primary Examiner* — Eric Thomas
(74) *Attorney, Agent, or Firm* — Sughrue Mion, PLLC

(57) ABSTRACT

An anode body for an electrolytic capacitor, prepared by sintering a tungsten powder to obtain a sintered body and subjecting the obtained sintered body to chemical conversion to form a dielectric layer comprising a tungsten trioxide compound on the surface of the sintered body, wherein the ratio of the hydration water in the tungsten trioxide compound becomes one molecule or less to 10 molecules of the tungsten trioxide compound. Use of the anode body of the present invention enables production of a tungsten capacitor, which is reduced in the capacitance change due to DC voltage (bias dependency).

5 Claims, 1 Drawing Sheet

(51) Int. Cl.
*H01G 9/15* (2006.01)
*H01G 9/052* (2006.01)

(58) Field of Classification Search
USPC .......................................................... 361/524
See application file for complete search history.

(56) References Cited

U.S. PATENT DOCUMENTS

2012/0321911 A1   12/2012   Watanabe et al.
2013/0277626 A1   10/2013   Naito

FOREIGN PATENT DOCUMENTS

| JP | 2013-212985 A | 10/2013 |
| WO | 2010/147236 A1 | 12/2010 |
| WO | 2012/086272 A1 | 6/2012 |

* cited by examiner

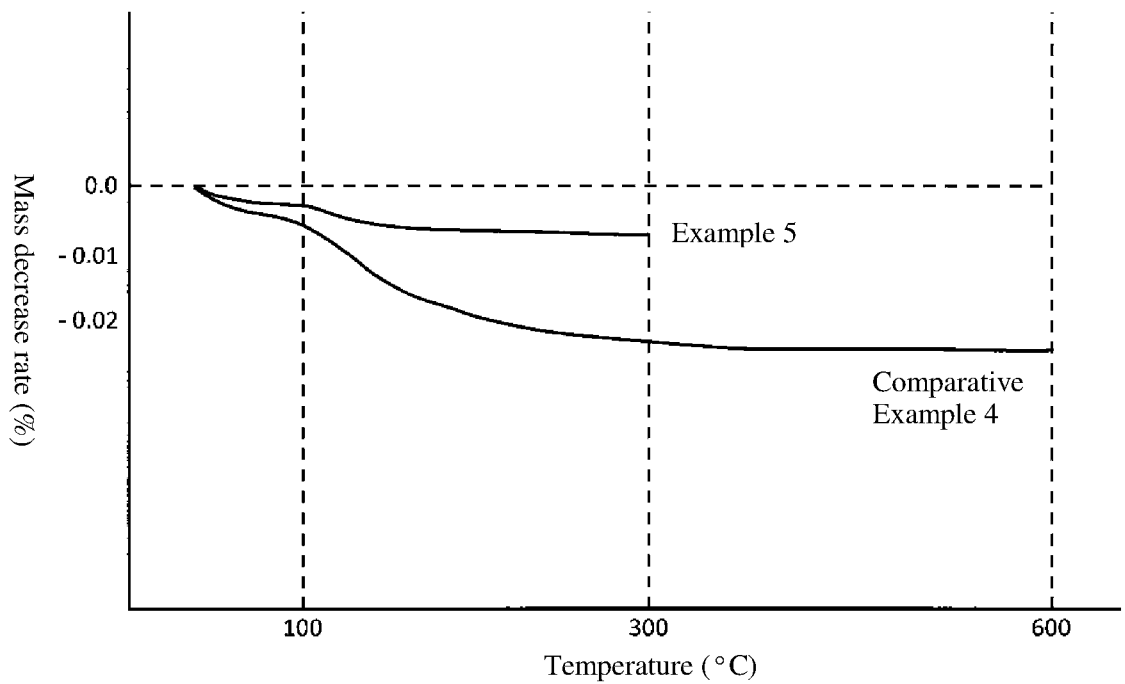

US 9,865,402 B2

ANODE BODY FOR TUNGSTEN CAPACITORS

CROSS REFERENCE TO RELATED APPLICATIONS

This application is a National Stage of International Application No. PCT/JP2014/076697 filed Oct. 6, 2014, claiming priority based on Japanese Patent Application No. 2013-272295 filed Dec. 27, 2013, the contents of all of which are incorporated herein by reference in their entirety.

TECHNICAL FIELD

The present invention relates to an anode body of a capacitor, which is formed of a tungsten sintered body. More specifically, the present invention relates to an anode body of a tungsten capacitor having a reduced capacitance change with respect to a direct-current (DC) voltage (bias voltage dependency), and a solid electrolytic capacitor using the anode body.

BACKGROUND ART

Along with a reduction in size, an increase in speed, and weight saving of electronic devices, such as a mobile phone and a personal computer, a capacitor to be used in these electronic devices is required to have a smaller size, a lighter weight, a higher capacitance, and a lower ESR.

A solid electrolytic capacitor is formed of, for example: an aluminum foil or a conductive body (anode body) formed of a sintered body of powder of a metal having a valve action, such as tantalum, niobium, or tungsten, serving as one electrode; a dielectric body layer formed of a metal oxide formed on a surface of the electrode through electrolytic oxidation of a surface layer of the electrode in an electrolyte aqueous solution, such as phosphoric acid; and another electrode (semiconductor layer) formed of a semiconductor layer formed on the dielectric body layer through electrolytic polymerization or the like.

Of the metals having a valve action, an electrolytic capacitor using a sintered body of powder of tungsten as an anode body has an extremely large capacitance change with respect to a DC voltage (bias voltage dependency) as compared to an electrolytic capacitor using an aluminum foil or a sintered body of powder of tantalum or niobium as an anode body, and hence has a problem of a difficulty in its use in a circuit for a precision device, which is required to have a small capacitance change of a capacitor.

DISCLOSURE OF INVENTION

Problem to be Solved by Invention

An object of the present invention is to provide an anode body of a tungsten capacitor in which a capacitance change with respect to a DC voltage (bias voltage dependency) of an electrolytic capacitor using a sintered body of tungsten powder as an anode body is reduced, and an electrolytic capacitor using the anode body.

Means to Solve Problem

As a result of intensive studies in consideration of the above-mentioned objective, the present inventors have found that a hydrate compound contained in a dielectric coating film comprising tungsten trioxide ($WO_3$), which dielectric coating film is generated by subjecting a sintered body of tungsten powder to chemical formation using an aqueous solution of an oxidizing agent, is highly involved in the bias dependence of a tungsten capacitor. The present inventors have confirmed that the bias dependence of a tungsten capacitor can be significantly improved by heating the sintered body under relatively mild conditions to remove water contained in the hydrate compound as a hydrate, and have accomplished the present invention.

That is, the present invention relates to an anode body of a tungsten capacitor, a solid electrolytic capacitor and a method for producing an anode body of capacitor as described below.

[1] An anode body for a capacitor, wherein a dielectric layer comprising a tungsten trioxide compound is formed on the surface of the anode body, and the ratio of the hydration water in the tungsten trioxide compound is one molecule or less to 10 molecules of the tungsten trioxide compound.

[2] An anode body for a capacitor, wherein a dielectric layer comprising a tungsten trioxide compound is formed on the surface of the anode body, and the ratio of the hydration water in the tungsten trioxide compound is one molecule or less to 10 molecules of the tungsten trioxide compound when the total mass decrease within a temperature range of higher than 100° C. and 600° C. or lower is defined as equivalent to the eliminated water molecules in the thermogravimetric and differential thermal analysis of the anode body.

[3] An electrolytic capacitor comprising the anode body for a capacitor described in [1] or [2] above. [4] A production method of an anode body for a capacitor, comprising sintering a tungsten powder to obtain a sintered body and subjecting the obtained sintered body to electrolytic oxidation in an aqueous electrolyte solution to form a dielectric layer comprising a tungsten trioxide compound on the surface of the sintered body, and the method comprises conducting heating treatment after the formation of the dielectric layer until the ratio of the hydration water in the tungsten trioxide compound becomes one molecule or less to 10 molecules of the tungsten trioxide compound.

[5] The production method as described in [4] above, wherein the heating treatment is conducted in air atmosphere at a temperature of from 190 to 300° C.

Effects of Invention

The present invention provides an anode body for a capacitor, wherein a dielectric layer comprising a tungsten trioxide is formed by subjecting a tungsten sintered body by subjecting a tungsten sintered body to chemical formation; and the ratio of the hydration water in the tungsten trioxide compound is one molecule or less to 10 molecules of the tungsten trioxide compound.

A capacitor using the anode body of the present invention undergoes smaller fluctuations in the capacitance of the capacitor with respect to a DC voltage (bias voltage dependency) and hence can be suitably used in circuits for precision equipment.

BRIEF DESCRIPTION OF DRAWINGS

FIG. 1 is a graph showing the mass decrease up to 600° C. of the anode body in Comparative Example 4 (without heat treatment) and the mass decrease up to 300° C. of the anode body in Example 5 (with heat treatment at 300° C. for four hours) by thermogravimetric and differential thermal analysis.

MODE FOR CARRYING OUT INVENTION

As tungsten powder serving as a raw material of a tungsten sintered body (unprocessed tungsten powder, which is hereinafter sometimes referred to as "primary powder") in the present invention, tungsten powders with a minimum of their average particle diameters of about 0.5 μm are commercially available. Tungsten powder having a smaller particle diameter enables production of a sintered body (anode) having smaller pores. Tungsten powder having a smaller particle diameter than those of the commercially available products may be obtained by, for example, pulverizing tungsten trioxide powder under a hydrogen atmosphere or reducing a tungstic acid or a tungsten halide through use of a reducing agent, such as hydrogen or sodium, under appropriately selected conditions.

In addition, such tungsten powder may also be obtained by directly reducing a tungsten-containing mineral or reducing the tungsten-containing mineral through a plurality of steps under appropriately selected conditions.

In the present invention, the tungsten powder serving as a raw material may be granulated powder (the granulated tungsten powder is hereinafter sometimes referred to simply as "granulated powder"). The granulated powder is preferred by virtue of good flowability and ease of operation, such as molding.

The above-mentioned granulated powder may be subjected to pore distribution adjustment by, for example, a method similar to a method disclosed in JP 2003-213302 A for niobium powder.

The granulated powder may also be obtained by, for example, forming the primary powder into a granular form having an appropriate size through addition of at least one kind of a liquid, such as water, a liquid resin, and the like, followed by heating under reduced pressure and then sintering. Easy-to-handle granulated powder in a granular form may be obtained by setting reduced pressure conditions (for example, 10 kPa or less in a non-oxidizing gas atmosphere, such as hydrogen) or leaving conditions at high temperature (for example, from 1,100° C. to 2,600° C. for 0.1 hour to 100 hours) through a preliminary experiment. There is no need to perform crushing when granules do not aggregate after granulation.

The particle diameter of such granulated powder may be uniformized through classification with a sieve. The case in which the granulated powder has an average particle diameter falling within a range of preferably from 50 μm to 200 μm, more preferably from 100 μm to 200 μm is advantageous because such granulated powder smoothly flows from a hopper of a molding machine to a mold.

The case in which the average particle diameter of the primary powder falls within a range of from 0.1 μm to 1 μm, preferably from 0.1 μm to 0.3 μm is preferred because, in particular, the capacitance of an electrolytic capacitor produced from its granulated powder can be increased.

When the granulated powder is obtained, the case in which the specific surface area (by a BET method) of the granulated powder is set to preferably from 0.2 m$^2$/g to 20 m$^2$/g, more preferably from 1.5 m$^2$/g to 20 m$^2$/g through, for example, adjustment of the above-mentioned primary particle diameter is preferred because the capacitance of the electrolytic capacitor can be further increased.

In the present invention, in order to improve the leakage current characteristics or the like of a capacitor to be obtained, a tungsten material (including the primary powder, the granulated powder, and the sintered body) may contain some impurities described below.

For example, tungsten powder containing tungsten silicide in at least a part of the surface region so as to have a silicon content within a specified range is preferably used. The tungsten powder containing tungsten silicide in at least a part of the surface region may be prepared by mixing 0.05 mass % to 7 mass % of silicon powder with tungsten powder, and then heating the mixture under reduced pressure to allow a reaction at from 1,100° C. to 2,600° C., or by pulverizing tungsten in a hydrogen stream and further mixing silicon powder therewith, and then heating the mixture at a temperature of from 1,100° C. to 2,600° C. under reduced pressure to allow a reaction.

As the tungsten powder, also tungsten powder further containing at least one selected from tungsten nitride, tungsten carbide, and tungsten boride in at least a part of a surface layer is preferably used.

In the present invention, the tungsten powder is molded into a molded body having a density of preferably 8 g/cm$^3$ or more, and the molded body is heated at a temperature of preferably from 1,480° C. to 2,600° C. for preferably from 10 minutes to 100 hours, to form a sintered body.

Next, the surface layer of the sintered body is subjected to electrolytic oxidation (chemical conversion) in an electrolyte aqueous solution. Through the chemical conversion, tungsten(VI) oxide, that is, tungsten trioxide (WO$_3$) is formed and serves as a dielectric coating film.

When leaving the sintered body (tungsten anode body) having a dielectric coating film formed thereon to stand, for example, in air at 190° C. for 20 hours, capacitance at a bias voltage of 3 V is almost the same as capacitance at a bias voltage of 0 V, and hence bias voltage dependency as generally seen is not seen.

Tungsten trioxide compounds include a tungsten acid (e.g., H$_2$WO$_4$, H$_4$WO$_5$), which is a hydrated compound including WO$_3$ and hydration water, in addition to WO$_3$. Tungsten trioxide (WO$_3$) is industrially manufactured by thermally decomposing the tungsten acid at from 900 K to 1,000 K in the atmosphere (Powder and Powder Metallurgy Terminology, p. 312, Nikkan Kogyo Shimbun, Ltd., 2001.). In addition, the tungsten acid is also commercially available in a form of powder as a reagent.

It is considered that tungsten acid as being a hydrate compound is generated by the above-mentioned chemical conversion treatment using an aqueous solution of an oxidizing agent. Further, it is considered that the hydration water is removed from a tungsten acid present in the dielectric body layer to produce tungsten trioxide (WO$_3$) by the above-mentioned heat treatment after the chemical conversion, and hence the characteristics of the capacitor are improved.

When a capacitor element once subjected to the heat treatment was left to stand in air at room temperature and then its capacitance was measured again, bias voltage dependency was not seen. From this, it is considered that if the hydration water is eliminated by heating, even though adsorbed water may attach afterward, the water does not become the hydration water again to deteriorate the capacitor characteristics.

Thermogravimetric and differential thermal analysis (TG-DTA) and measurement of the oxygen content were conducted on an anode body obtained by subjecting a sintered body (anode body having a dielectric coating film formed thereon), which was subjected to chemical formation treatment, to heat treatment by changing the heating temperature and time. From the results, the hydration water amount and the tungsten trioxide compound amount were determined to thereby calculate the ratio of the hydration water in the tungsten trioxide compound constituting the dielectric coating film.

When the ratio of the hydration water is one molecule or less to 10 molecules of the tungsten trioxide compound, bias voltage dependency was not seen when the capacitance of a capacitor was measured by applying a different bias voltage.

Hence, the present invention is to provide an anode body for a capacitor having a dielectric layer comprising a tungsten trioxide compound formed on its surface by, for example, sintering a tungsten powder and subjecting the resultant sintered body to chemical formation, in which anode body the ratio of the hydration water in in the tungsten trioxide compound is one molecule or less to 10 molecules of the tungsten trioxide compound.

At the time of producing the anode body for a capacitor of the present invention, there is no particular limitation on the conditions of the heating treatment after the formation of a dielectric layer by chemical formation treatment as long as the ratio of the hydration water in the tungsten trioxide compound after the treatment is one molecule or less to 10 molecules of the tungsten trioxide compound. An anode body for a capacitor may be heated under conditions that will minimize deterioration of the anode body until the ratio of the hydration water in the tungsten trioxide compound becomes one molecule or less to 10 molecules of the tungsten trioxide compound.

Most of hydration water can be eliminated by elevating the heating temperature to 600° C. (FIG. 1). In the heating in air (oxygen atmosphere), a capacitor element may be deteriorated due to further oxidation of the capacitor anode body and crystallization of the dielectric coating film. Therefore, it is desirable to conduct the heating treatment of the anode body under an inert gas atmosphere.

However, in consideration of mass production, it is desirable to conduct heat treatment in the present invention at a temperature of 190 to 300° C. in air atmosphere, which is less costly. Even in this temperature range, it is possible to make the hydration water in the tungsten trioxide compound be one molecule or less to 10 molecules of the tungsten trioxide compound by heating the anode body over time.

In the above description, a method by heating was explained as an example of a method for removing the hydration water in the dielectric layer comprising tungsten trioxide. However, the method is not limited thereto as long as a method can reduce the ratio of the hydration water in tungsten trioxide.

A possible cause of bias voltage dependency caused by the presence of the hydration water is that the dielectric body formed of a tungstic acid has symmetry distortion owing to the presence of the hydration water, and hence shows spontaneous polarization. Meanwhile, it is considered that tungsten trioxide, in which the hydration water is not contained, does not have symmetry distortion, and hence does not exhibit the bias voltage dependency.

EXAMPLES

The present invention is described below by referring to Examples and Comparative Examples, but the present invention is not limited thereto.

Calculation of the Ratio of Hydrate in the Tungsten Trioxide Compound:

Thermogravimetric and differential thermal analysis (TG-DTA) was conducted on five pieces of anode bodies having a dielectric layer formed thereon and five pieces of anode bodies per Example or Comparative Example, which were obtained by subjecting the above anode bodies to heat treatment under conditions as in Table 1 and Table 2.

In thermogravimetric and differential thermal analysis, the anode body was heated by elevating temperature at a rate of 10° C. per minute to 600° C. to measure the decrease in mass. The total decrease in mass at 600° C. was assumed to be equal to all of the eliminated absorbed water and hydration water, and the decrease in mass at 100° C. or lower was assumed due to the eliminated absorbed water. That is, the total decrease in mass at more than 100° C. and 600° C. or less was assumed to be equal to the eliminated hydration water. From the measurement results of these anode bodies having formed a dielectric layer thereon, the amount of the hydration water in the anode bodies not yet subjected to heat treatment and the amount of the hydration water in the anode bodies in each of examples which had been subjected to heat treatment were determined.

Subsequently, measurement of the oxygen content was conducted on the anode body samples before the formation of a dielectric layer, and the samples obtained by subjecting the anode bodies after the formation of a dielectric layer in each of examples to heat treatment in argon atmosphere at 600° C.

The difference of the oxygen content in the anode bodies before and after the formation of a dielectric layer was assumed to be the oxygen content excluding the that in the absorbed water and hydration water in the dielectric layer (i.e.: the oxygen content in $WO_3$). The molar quantity of tungsten trioxide in the dielectric layer was assumed to be one third of that of the oxygen content in $WO_3$. The oxygen content was measured by the infrared adsorption method with an oxygen determinator (TC-600; produced by LECO Corporation) by elevating the sample temperature to 2,500° C.

From the measurement results of the amount of hydration water and the amount of the tungsten trioxide compound, the ratio of the hydration water molecules to 10 molecules of a tungsten trioxide compound was calculated.

The ratio of the hydration water molecules as being the number of hydration water molecules to 10 molecules of a tungsten trioxide compound (an average value of five pieces of anode bodies per example) is shown in Table 1 and Table 2.

Examples 1 to 5, Comparative Examples 1 to 4

Commercially available tungsten powder having a volume average particle diameter of 0.65 μm was left in a vacuum furnace at 1,400° C. for 30 minutes, and then taken out from there at room temperature. The resultant agglomerate was crushed to produce granulated powder having a volume average particle diameter of 75 μm. The powder was molded with a molding machine with a tantalum wire having a diameter of 0.29 mm planted. Further, the resultant was sintered in a vacuum furnace at 1,470° C. for 20 minutes to produce 1,000 sintered bodies each having a size of 1.0 mm×3.0 mm×4.4 mm (mass: 120 mg, the tantalum wire entered inside by 3.4 mm at the center of a surface having a size of 1.0 mm×3.0 mm and protruded outside by 6 mm). Each sintered body was subjected to chemical conversion through use of a 3 mass % ammonium persulfate aqueous solution as a chemical conversion liquid at an initial current density per sintered body of 2 mA and a voltage of 10 V at a temperature of 50° C. for 5 hours, to form a dielectric body layer on the outer surface and the inner surface of a porous part of the sintered body. The sintered body was washed with water, then washed with ethanol, and subjected to heat treatment in air atmosphere under the heat treatment conditions shown in Table 1. The chemically converted sintered bodies (anode bodies) produced in Examples except for Comparative Example 4 and the chemically converted sintered body (anode body) of Comparative Example 4 not subjected to the heat treatment were each measured for the capacitance of a capacitor at each bias voltage of 0 V, 2 V, and 3 V through use of a 50 mass % sulfuric acid aqueous solution as an electrolytic solution. The average values of 30 sintered bodies in each example are also shown in Table 1.

TABLE 1

| | Heat treatment conditions | | Ratio of the hydration water 1) | Capacitance at each bias voltage (μF) | | |
|---|---|---|---|---|---|---|
| | Temperature | Time | | 0 V | 2 V | 3 V |
| Example 1 | 190° C. | 10 hours | 0.6 | 651 | 648 | 647 |
| Example 2 | 190° C. | 24 hours | 0.5 | 655 | 652 | 650 |
| Example 3 | 220° C. | 6 hours | 0.7 | 659 | 656 | 656 |
| Example 4 | 250° C. | 5 hours | 0.7 | 662 | 658 | 656 |
| Example 5 | 300° C. | 4 hours | 1 | 666 | 663 | 662 |
| Comparative Example 1 | 125° C. | 24 hours | 2.6 | 853 | 645 | 640 |
| Comparative Example 2 | 160° C. | 24 hours | 2.5 | 866 | 651 | 647 |
| Comparative Example 3 | 190° C. | 5 hours | 2.7 | 872 | 654 | 650 |
| Comparative Example 4 | No heat treatment | | 2.6 | 869 | 660 | 658 |

1) Represented by the Number of Molecules of the Hydration Water to 10 Molecules of the Tungsten Trioxide Compound Examples 6 to 10, Comparative Examples 5 to 7

Sintering and chemical conversion were performed in the same manner as in Example 1 except that the commercially available tungsten powder was mixed with 0.4 mass % of commercially available silicon powder having an average particle diameter of 1 μm, granulated powder was produced at 1,450° C. and in addition the sintering temperature was changed to 1,540° C., and a 4 mass % potassium persulfate aqueous solution was used as the chemical conversion liquid, and the initial current density per sintered body, the voltage, and the temperature were changed to 5 mA, 15 V, and 40° C., respectively. The chemically converted sintered body (anode body) subjected to the heat treatment was each measured for the capacitance of a capacitor at each bias voltage of 0 V, 2 V, and 3 V. The average values of 30 sintered bodies in each example are shown in Table 2.

TABLE 2

| | Heat treatment conditions | | Ratio of the hydration water 2) | Capacitance at each bias voltage (μF) | | |
|---|---|---|---|---|---|---|
| | Temperature | Time | | 0 V | 2 V | 3 V |
| Example 6 | 190° C. | 10 hours | 0.6 | 452 | 450 | 450 |
| Example 7 | 190° C. | 24 hours | 0.5 | 455 | 453 | 451 |
| Example 8 | 220° C. | 6 hours | 0.7 | 459 | 455 | 455 |
| Example 9 | 250° C. | 5 hours | 0.7 | 463 | 460 | 457 |
| Example 10 | 300° C. | 4 hours | 1 | 466 | 464 | 462 |
| Comparative Example 5 | 125° C. | 24 hours | 2.6 | 579 | 445 | 442 |
| Comparative Example 6 | 160° C. | 24 hours | 2.6 | 582 | 448 | 445 |
| Comparative Example 7 | 190° C. | 5 hours | 2.7 | 596 | 456 | 450 |

2) Represented by the Number of Molecules of the Hydration Water to 10 Molecules of the Tungsten Trioxide Compound As can be seen from the results in Table 1 and Table 2, the anode body of Examples 1 to 10 subjected to heat treatment so as to make the ratio of $H_2WO_4$ molecules be 1 or less to 10 molecules of the tungsten trioxide compound ($WO_3$ and $H_2WO_4$) showed good results with little change in the capacitance when a DC bias voltage was applied, compared to the sintered body not subjected to heat treatment (Comparative Example 4) and the sintered body (Comparative Examples 1 to 3 and 5 to 7) subjected to heat treatment under conditions such that the ratio of $H_2WO_4$ molecules exceeds 1 to 10 molecules of the tungsten trioxide compound ($WO_3$ and $H_2WO_4$).

When the ratio of the hydration water molecules is 1 or less to 10 molecules of the tungsten trioxide compound in the anode body subjected to heat treatment, which was produced in Examples (Examples 1 to 10) and Comparative Examples (Comparative Examples 1 to 7), bias voltage dependency was not observed when the capacitance was measured at each bias voltage of 0 V, 2 V, and 3 V.

The invention claimed is:

1. An anode body for a capacitor, wherein a dielectric layer comprising a tungsten trioxide compound is formed on a surface of the anode body, and a ratio of hydration water in the tungsten trioxide compound is one molecule or less to 10 molecules of the tungsten trioxide compound.

2. An electrolytic capacitor comprising the anode body for a capacitor claimed in claim 1.

3. An anode body for a capacitor, wherein a dielectric layer comprising a tungsten trioxide compound is formed on a surface of the anode body, and a ratio of hydration water in the tungsten trioxide compound is one molecule or less to 10 molecules of the tungsten trioxide compound when a total mass decrease within a temperature range of higher than 100° C. and 600° C. or lower is defined as equivalent to eliminated water molecules in a thermogravimetric and differential thermal analysis of the anode body.

4. A production method of an anode body for a capacitor, comprising sintering a tungsten powder to obtain a sintered body and subjecting the obtained sintered body to electrolytic oxidation in an aqueous electrolyte solution to form a dielectric layer comprising a tungsten trioxide compound on a surface of the sintered body, and the method comprises conducting heating treatment after the formation of the dielectric layer until a ratio of hydration water in the tungsten trioxide compound becomes one molecule or less to 10 molecules of the tungsten trioxide compound.

5. The production method as claimed in claim 4, wherein the heating treatment is conducted in air atmosphere at a temperature of from 190 to 300° C.

* * * * *